US008799309B2

(12) United States Patent
Kolathaya et al.

(10) Patent No.: US 8,799,309 B2
(45) Date of Patent: Aug. 5, 2014

(54) VERIFYING NETWORK DELIVERY OF INFORMATION TO A DEVICE BASED ON PHYSICAL CHARACTERISTICS

(75) Inventors: Suraj Nadubettu Kolathaya, Coppell, TX (US); Rajkumar Williams Thomas Ponnusamy, Carrollton, TX (US); Sriharsha S. Amalpurapu, Highland, TX (US); Yung Cheng, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 895 days.

(21) Appl. No.: 12/639,224

(22) Filed: Dec. 16, 2009

(65) Prior Publication Data

US 2011/0145273 A1  Jun. 16, 2011

(51) Int. Cl.
*G06F 7/00* (2006.01)
*G06F 17/30* (2006.01)
*H04W 12/06* (2009.01)

(52) U.S. Cl.
CPC .................................... *H04W 12/06* (2013.01)
USPC ......................................................... 707/769

(58) Field of Classification Search
None
See application file for complete search history.

(56) References Cited

U.S. PATENT DOCUMENTS

| | | | |
|---|---|---|---|
| 5,684,951 A * | 11/1997 | Goldman et al. ...... | 707/999.009 |
| 5,946,611 A * | 8/1999 | Dennison et al. .......... | 455/404.2 |
| 6,353,852 B1 * | 3/2002 | Nestoriak et al. ............. | 709/206 |
| 6,369,705 B1 * | 4/2002 | Kennedy ....................... | 340/506 |
| 6,384,709 B2 * | 5/2002 | Mellen et al. .................. | 340/5.2 |
| 6,546,392 B1 * | 4/2003 | Bahlmann .............. | 707/999.009 |
| 6,842,449 B2 * | 1/2005 | Hardjono ....................... | 370/352 |
| 7,096,192 B1 * | 8/2006 | Pettitt ......................... | 705/26.35 |
| 2001/0015691 A1 * | 8/2001 | Mellen et al. .................. | 340/5.2 |
| 2002/0029226 A1 * | 3/2002 | Li et al. ....................... | 707/104.1 |
| 2002/0174090 A1 * | 11/2002 | Dexter ............................. | 707/1 |
| 2004/0054905 A1 * | 3/2004 | Reader .......................... | 713/171 |
| 2005/0278114 A1 * | 12/2005 | Ahmad .......................... | 701/211 |
| 2006/0059004 A1 * | 3/2006 | Ussery et al. ..................... | 705/1 |
| 2008/0222734 A1 * | 9/2008 | Redlich et al. .................. | 726/26 |
| 2008/0276318 A1 * | 11/2008 | Leung et al. .................... | 726/23 |
| 2009/0055315 A1 * | 2/2009 | Felger ............................. | 705/40 |
| 2009/0144329 A1 * | 6/2009 | Marlow .................... | 707/104.1 |

OTHER PUBLICATIONS

Alfuraih, Saleh, and Richard Snow. "Location of trusted email for prevention of credit card fraud in soft-products e-commerce." WSEAS Transactions on Computers 3.6 (2004): 1829-1838.*

Alfuraih, Saleh I., Nien T. Sui, and Dennis McLeod. "Using trusted email to prevent credit card frauds in multimedia products." World Wide Web 5.3 (2002): 245-256.*

* cited by examiner

*Primary Examiner* — Jay Morrison (57) ABSTRACT

A device may include a network interface configured to receive verification requirements and a message from a source device. In addition, the device may include a processor configured to receive a request from a destination device to send the message to the destination device, validate a logical address provided in the message based on a physical characteristic described or referenced in the verification requirements, and send the message to the destination device when the processor successfully validates the logical address based on the physical characteristic.

20 Claims, 9 Drawing Sheets

VERIFYING NETWORK DELIVERY OF INFORMATION TO A DEVICE BASED ON PHYSICAL CHARACTERISTICS

BACKGROUND

Current techniques for securely providing information from a network device to a user device include establishing a communication session between the network device and the user device over a secure socket layer, exchanging messages with digital signatures, and/or authenticating the user device based on public-key encryption.

DETAILED DESCRIPTION

The following detailed description refers to the accompanying drawings. The same reference numbers in different drawings may identify the same or similar elements. As used herein, the terms "sender" and "recipient" may refer to two endpoints of a communication. The communication may include exchanging information by conveyance of one or more messages (e.g., email messages, text messages, instant messages, etc.) or communication sessions (e.g., a Session Initiation Protocol (SIP) session, data streaming session, etc.).

In the following, a network device or system may verify network delivery of information to a device based on physical characteristics that are associated with the device, such as an Media Access Control (MAC) address, an IP address provided by a service provider, geographical location of the device (e.g., latitude, longitude, and altitude), physical address of the geographical location (e.g., 2121 Melrose Place, San Diego, Calif. 92311), time of the delivery, etc. This may provide security and flexibility in delivering secure information.

Figure 1:
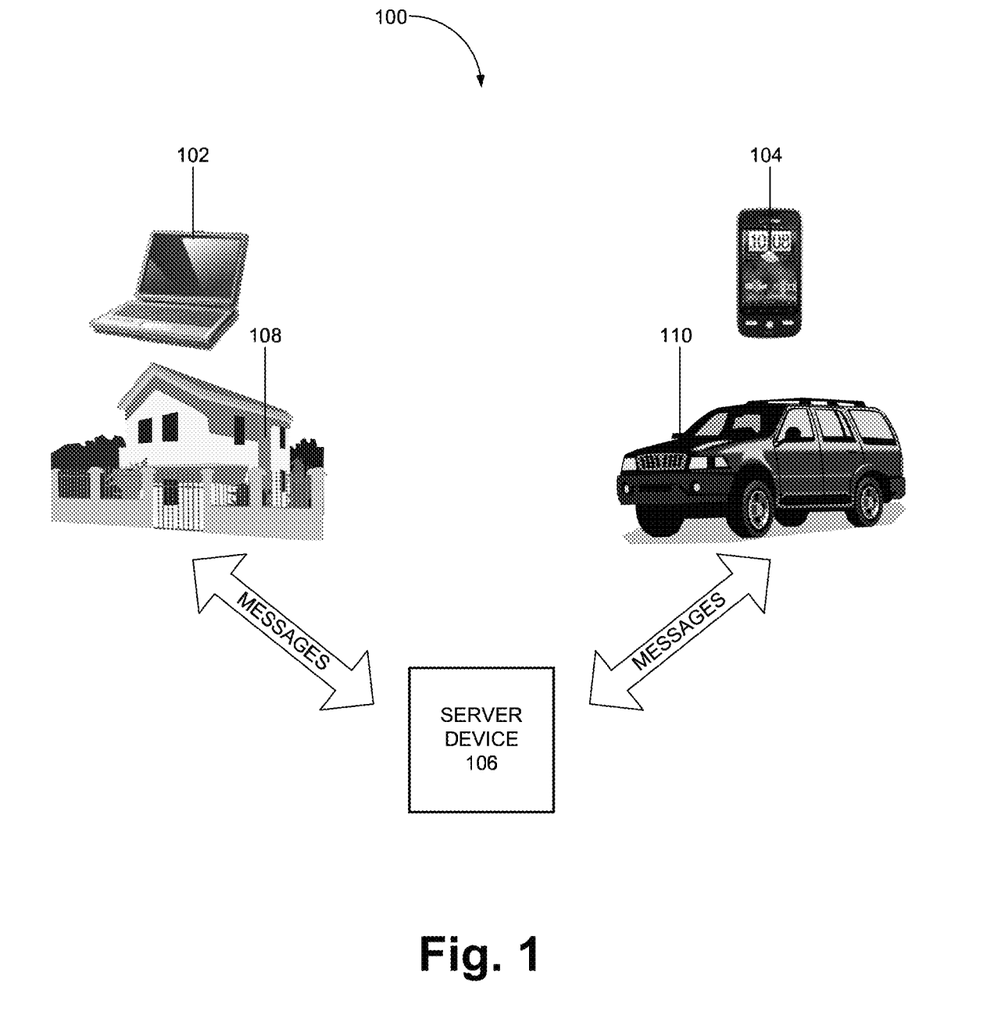
FIG. 1 illustrates concepts described herein.

FIG. 1 illustrates one of the concepts described herein. Assume that system 100 includes a laptop computer 102, smart phone 104, and a server device 106. Laptop computer 102 and smart phone 104 are in Jerry's house 108 and Elaine's automobile 110, respectively. In addition, assume that Jerry has placed an advertisement for a couch with craigslist, and Elaine has visited Jerry's house to inspect the couch.

Having decided to purchase the couch, Elaine wants to send a payment to Jerry. Elaine enters, into a payment application installed on smart phone 104, Jerry's physical address provided in the advertisement and Jerry's email address. Subsequently, the payment application sends a query to server device 106.

Server device 106 verifies that Jerry's email address and the physical address match, and notifies the payment application. Thereafter, the payment application automatically makes a payment to Jerry via an online payment service (e.g., PayPal).

In the above example, system 100 provides increased security in delivering information (e.g., an electronic payment) by verifying physical characteristics (e.g., Jerry's physical home address) that are associated with an endpoint of communication (e.g., Jerry's email client installed on laptop computer 102 in house 108).

Figure 2:
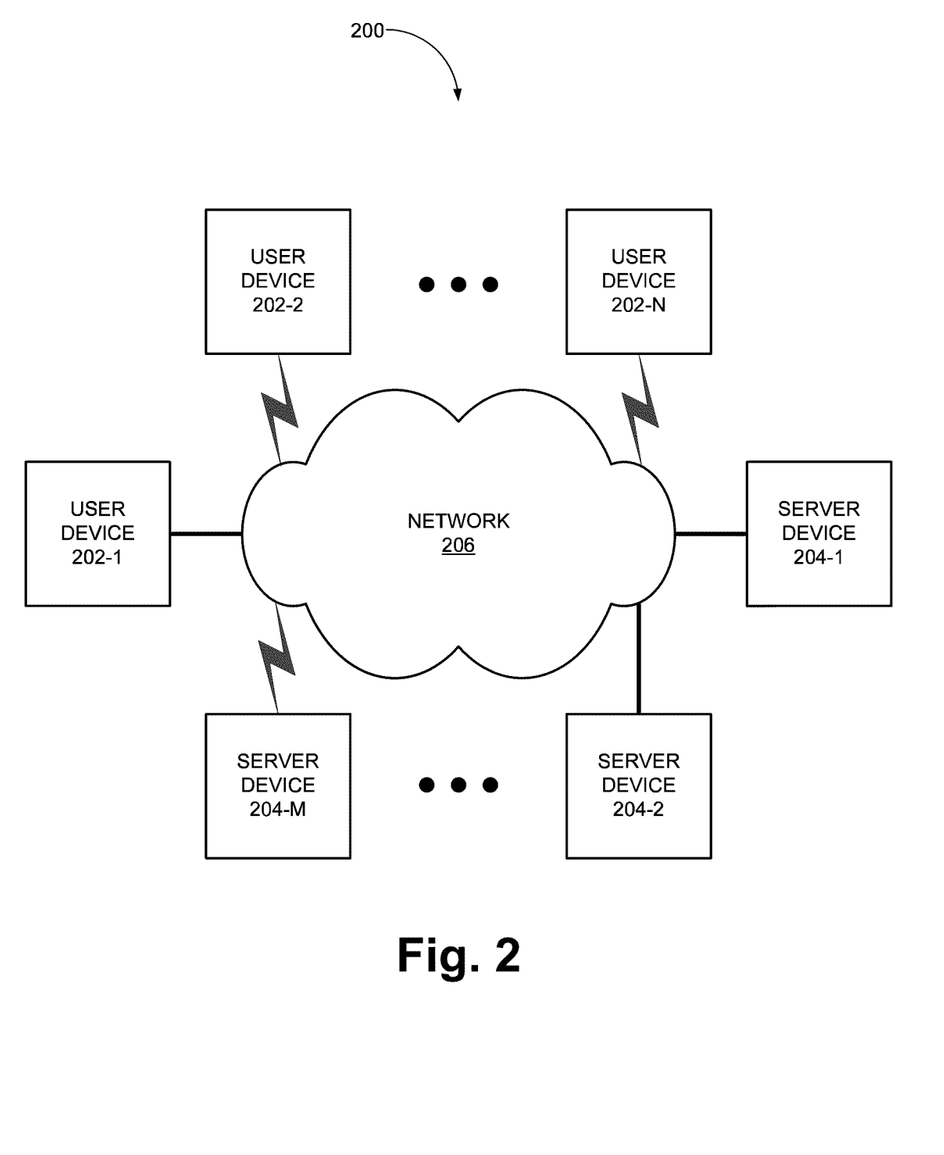
FIG. 2 is a block diagram of an exemplary network in which the concepts described herein may be implemented.

FIG. 2 is a block diagram of an exemplary network 200 in which the concepts described herein may be implemented. As shown, network 200 may include user devices 202-1 through 202-N (collectively "user devices 202" and individually "user device 202"), server devices 204-1 through 204-M (collectively "server devices 204" and individually "server device 204"), and network 206. Depending on the implementation, network 200 may include additional, fewer, or different devices than those illustrated in FIG. 2.

User device 202 may include any of the following devices that have the ability to, or are adapted to communicate with another device and/or host an application: a set-top box, an optical network terminal (ONT), a mobile telephone, a personal digital assistant (PDA), an electronic notepad, a laptop computer, a personal computer (PC), etc. In some implementations, user device 202 may include a Global Positioning System (GPS) component for determining its own location.

In operation, user device 202 may initiate and/or verify a logical destination address of another user device 202 in network 200 based on physical characteristics associated with the device. In initiating or performing the verification, user device 202 may be a sender or a recipient of data. Once the logical destination is verified, user device 202 may communicate with the recipient device.

Server device 204 may initiate and/or verify a logical destination address of user device 202 on behalf of another user device 202. Alternatively, server device 204 may provide information to user device 202 so that user device 202 can perform the verification.

In some implementations, when the verification is successful, server device 204 may enable sender and recipient user devices 202 in communicating with one another. For example, when server device 204 receives a message from a sender user device 202, server device 204 may search its database and/or contact a recipient user device 202 to authenticate the recipient device 202. Upon successful authentication, server device 204 may allow the recipient user device 202 to communicate with the sender user device 202. For example, server device 204 may allow the sender user device 202 to establish an instant messaging session with the recipient user device 202, or alternatively, relay the message from the sender user device 202 to the recipient user device 202.

Network 206 may include a fiber-optics network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks. Devices (e.g., user devices 202, server devices 204, etc.) that are shown in FIG. 2 may connect to network 206 via wireless or wired communication links. In addition, network 206 may allow any of devices 202 and 204 to communicate with any other device 202 and 204. In some embodiments, devices 202 and 204 may communicate with each other directly rather than through network 206.

Figure 3:
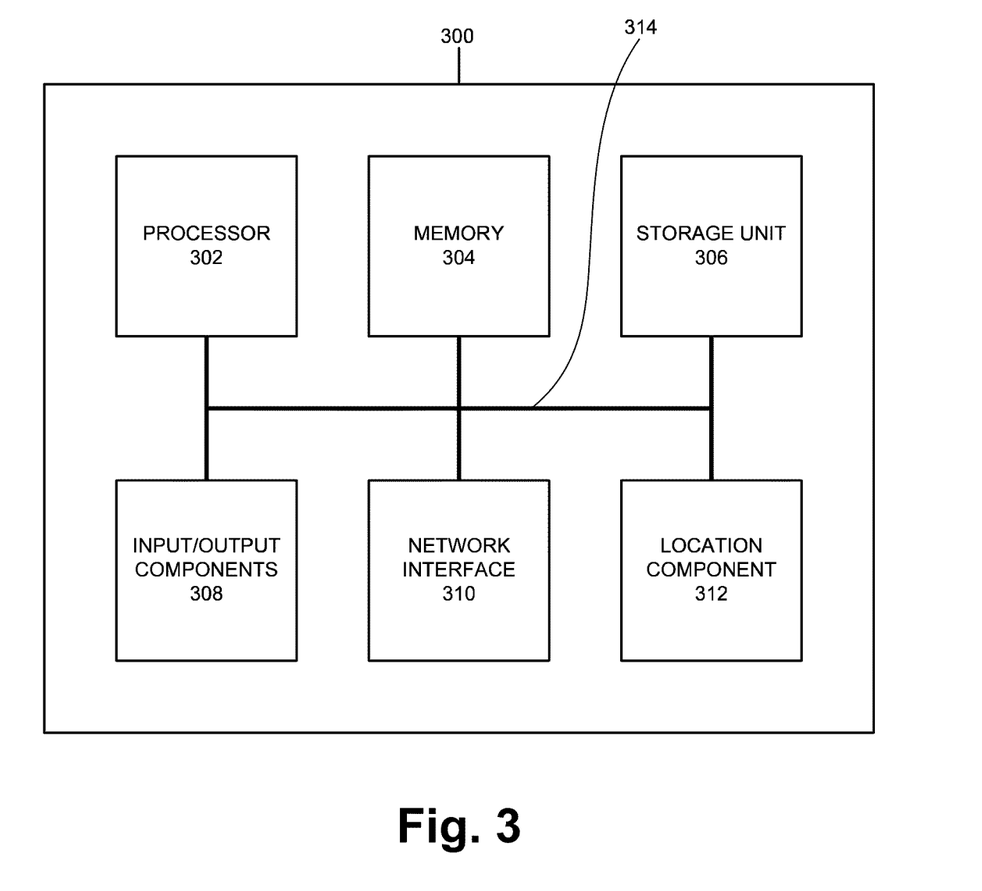
FIG. 3 is a block diagram of an exemplary network device of FIG. 2.

FIG. 3 is a block diagram of an exemplary network device 300, which may correspond to user device 202 or server device 204. As shown, network device 300 may include a processor 302, a memory 304, storage unit 306, input/output components 308, a network interface 310, and a communication path 312. In different implementations, network device 300 may include additional, fewer, or different components than the ones illustrated in FIG. 3. For example, network device 300 may include line cards for receiving and forwarding data.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), which may include onboard cache, for storing data and machine-readable instructions. Storage unit 306 may a floppy disk, CD ROM, CD read/write (R/W) disc, and/or flash memory, as well as other types of storage devices.

Input/output components 308 may include a display screen, a keyboard, a mouse, a speaker, a microphone, a Digital Video Disc (DVD) writer, a DVD reader, Universal Serial Bus (USB) port, and/or other types of components for converting physical events or phenomena to and/or from digital signals that pertain to network device 300.

Network interface 310 may include any transceiver that enables network device 300 to communicate with other devices and/or systems. Through network interface 310, network device 200 may communicate via network 206. Additionally or alternatively, network interface 310 may include a modem, an Ethernet interface to a LAN, and/or an interface/connection for connecting network device 300 to other devices (e.g., a Bluetooth interface). In some implementations, network interface 310 may include an identifier (e.g., Network Interface Card (NIC) Media Access Control (MAC) address) or may be associated with an Internet Protocol (IP) address (e.g., a static IP address).

Location component 312 may include a global positioning system (GPS) receiver chip and/or any other component for determining a geographic location of network device 300. Communication path 314 may provide an interface through which components of network device 300 can communicate with one another.

Figure 4:
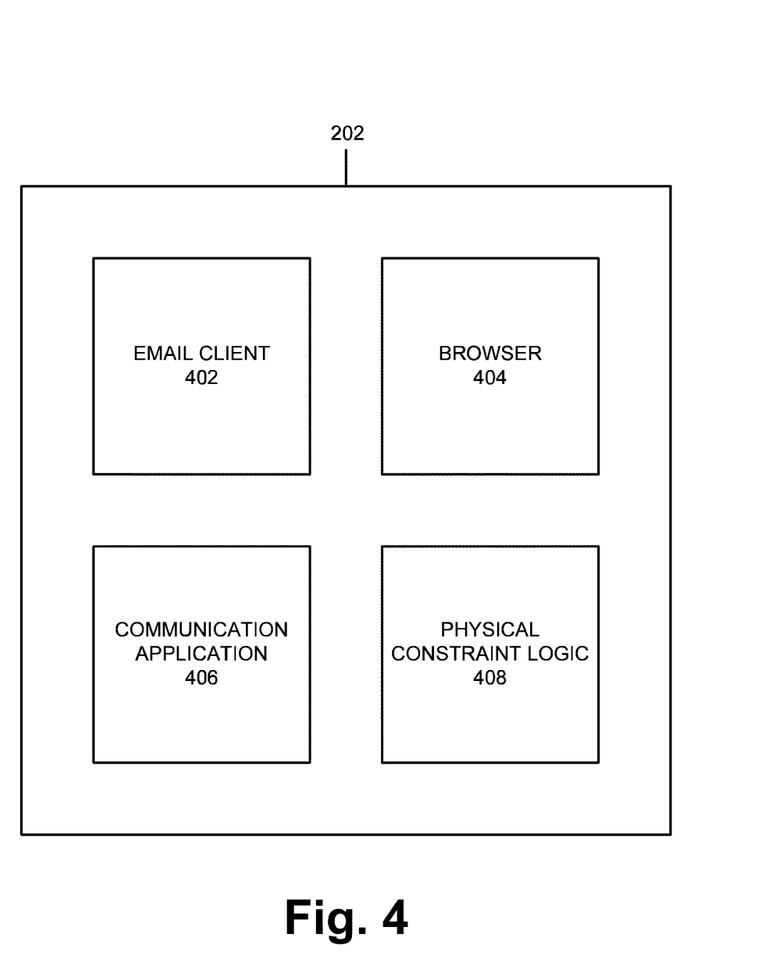
FIG. 4 is a functional block diagram of an exemplary user device of FIG. 2.

FIG. 4 is a functional block diagram of user device 202. As shown, user device 202 may include an email client 402, browser 404, communication application 406, and physical constraint logic 408. Depending on the implementation, user device 202 may include additional components, such as computer peripherals, an operating system (e.g., Linux, Windows, etc.), a business or game application, an instant messaging application, etc.

Email client 402 may send or receive email messages on behalf of users (e.g., email account holders). Browser 404 may exchange information with web servers and/or other web-server like components in network 200. Communication application 406 may establish a communication session with another device in network 200. Via communication application 406, for example, user device 202 may place a call (e.g., Voice-over-Internet-Protocol (VoIP)), receive content (e.g., music, movies, etc.), and/or provide for other types of communication.

Physical constraint logic 408 may send a request to server device 204 to verify a logical network address based on one or more physical characteristics that are associated with the logical network address. Alternatively, physical constraint logic 408 may itself perform the verification based on information that physical constraint logic 408 receives from server device 204.

For example, assume that a user types in an email address in a "to" field of an email message. In such a case, physical constraint logic 408 may send a query to a database in server device 204, requesting server device 204 to verify that the email address is associated with a real physical address.

In another example, physical constraint logic 408 may allow a user at email client 402, for example, to obtain an email address based on a device characteristic that the user provides. For example, the user may type in a physical address and/or an IP address at email client 402. In response, physical constraint logic 408 implemented as part of email client 402 may contact appropriate server device 204 and request server device 204 to lookup the email based on the physical address/IP address. Upon receipt of the email address, physical constraint logic 408 may relay the email address to the user or email client 402.

In some implementations, physical constraint logic 408 may obtain physical characteristics about its host user device 202 (e.g., obtain geographical coordinates of user device 202 from location component 312) and store the coordinates in memory 304 and/or storage unit 306. Physical constraint logic 408 may provide this information to server device 204 when server device 204 requests the information from user device 202, as a requirement before server device 204 allows client applications on user device 202 to access a message or establish a session via server device 204.

In some implementations, a service provider may have installed user device 202 (e.g., an ONT, router and/or set-top box) at the user's premise. In such implementations, physical constraint logic 408 may alert the service provider or server device 204 of any user device 202 dislocation and prevent user device 202 from being misused. Such functionality may guarantee or increase the authenticity of logical addresses that are verified via physical constraint logic 408 and/or server device 204.

Depending on the implementation, physical constraint logic 408 may operate in a stand-alone mode, or in conjunction with another component (e.g., browser) as a plug-in. Alternatively, physical constraint logic 408 may be integrated into another component, such as email client 402 or communication application 406. In either case, in some of the implementations, physical constraint logic 408 may include graphical user interface (GUI) components to allow a user to specify one or more physical characteristics that are to be used for verifying logical destination address.

Figure 5:
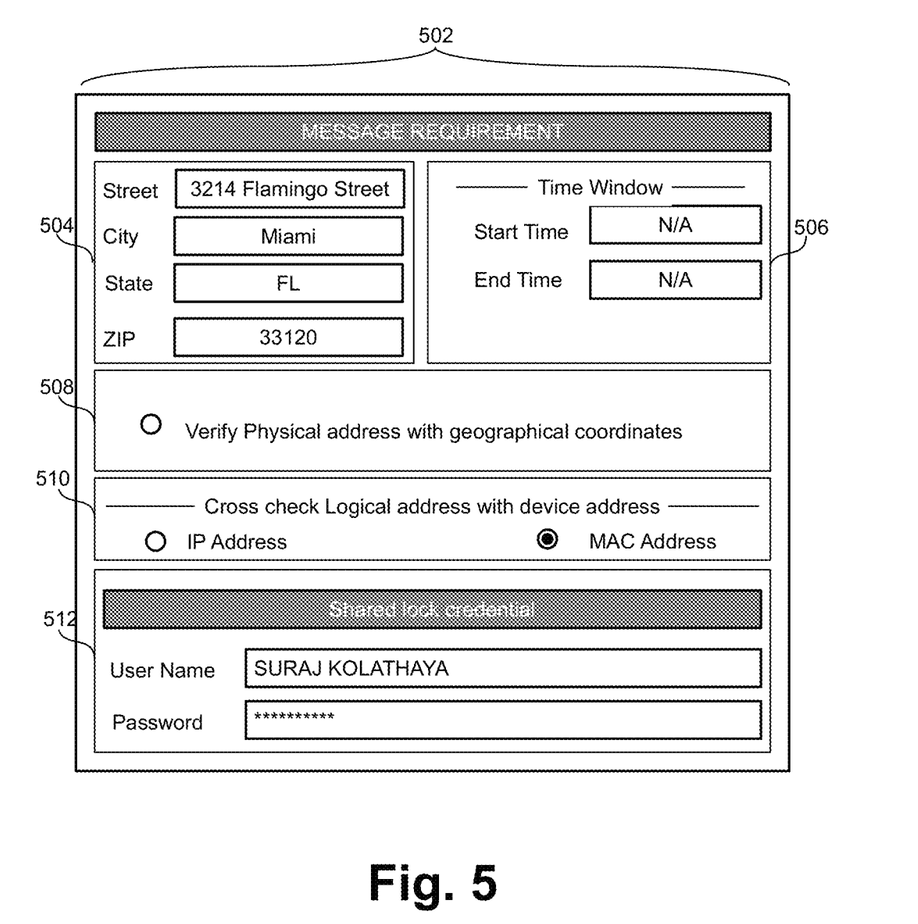
FIG. 5 shows an exemplary graphical user interface (GUI) window of the physical constraint logic of FIG. 4.

FIG. 5 shows an exemplary GUI window 502 of physical constraint logic 408. As shown, GUI window 502 may include an address pane 504, time pane 506, physical-address check pane 508, device check pane 510, and additional authentication pane 512.

Address pane 504 may receive, from a user, a physical address that the user wants to be used for verifying a logical address. For example, assume that the email address (i.e., the logical address) of an email recipient is Chelsea@dressesgalore.com. In addition, assume that a user inputs the address "3214 Flamingo Street, Miami, Fla. 33120" in fields provided in address pane 504. When the user sends an email message to Chelsea@dressesgalore.com, the physical address, which is input via address pane 504 may be sent along with the email message to server device 204 that is to relay the message to Chelsea. Server device 204 may use the physical address to verify that the Chelsea@dressesgalore.com is the correct email address.

Time pane 504 may receive, from a user, a starting time and an end time of a time window in which the recipient is allowed to access a message or content from the user. For example, assume that the user inputs 2:00 p.m. and 3:00 p.m. as the start time and the end time. The time window information may be sent to server device 204. Server device 204, which is to relay the message or content to the recipient, may use the time window information to allow or prevent the recipient from accessing the message/content.

Physical-address check pane 508 may receive an indication from a user whether the physical address input at physical address pane 504 is to be used to verify a geographical coordinates of the destination address. Device check pane 510 may receive an indication from a user whether a known IP address and/or a MAC address (e.g., MAC address of network interface 310 of the recipient user device 202 or of a router connected to user device 202 at the recipient user's home (e.g., a home router provided by an ISP)) is to be used to verify the logical address.

In some implementations, device check pane 510 may not provide the user with the option of using an IP address to verify the logical address. For example, in some situations, server device 204 that supports physical constraint logic 408 may be unable to easily obtain IP addresses that are associated with recipient user devices 202. In such cases, device check pane 510 may omit the IP address feature. In contrast, when server device 204 is operated, for example, by an Internet service provider, server device 204 may be able to obtain a up-to-date recipient IP address (which can change in real time) and use the IP address to verify the logical address.

Additional authentication pane 512 may receive authentication information. As shown, the authentication information may include a user name and password. In a different implementation, the authentication pane 512 may accept a digital key, signed document, biometric profile, or any other type of authentication information. In one implementation, the user may be required to input the authentication information to be able to successfully forward an email message to the potential recipient. In a different implementation, server device 204 may compare such authentication information to information that the potential recipient must supply to server device 204 before the recipient is allowed to access a corresponding message/content.

Depending on the implementation, GUI window 502 may include additional, fewer, or different arrangement of components than those illustrated in FIG. 5. For example, GUI window 502 may be implemented as part of a drag down menu in email client 402, or as one of available email client options that a user can configure. In another example, GUI window 502 may be implemented as one of configurable components for browser 404 (e.g., settings under a security menu for downloading or uploading) or part of file browser for uploading an electronic asset (e.g., a document, video clip, music, etc.). In yet another example, in some implementations, time pane 506, physical-address check pane 508, device check pane 510, and additional authentication pane 512 may be provided in an optional category menu/section.

In still other implementations, GUI window 502 may allow a user to input a physical address or another physical characteristic for a reverse lookup to obtain the email address of the recipient. In still other implementations, a user may input a logical address (e.g., email address) that is sent to server device 204 (e.g., with a web server). Server device 204 may perform a lookup and send the physical address to user device 202, which may populate, for example, physical address pane 504.

Figure 6:
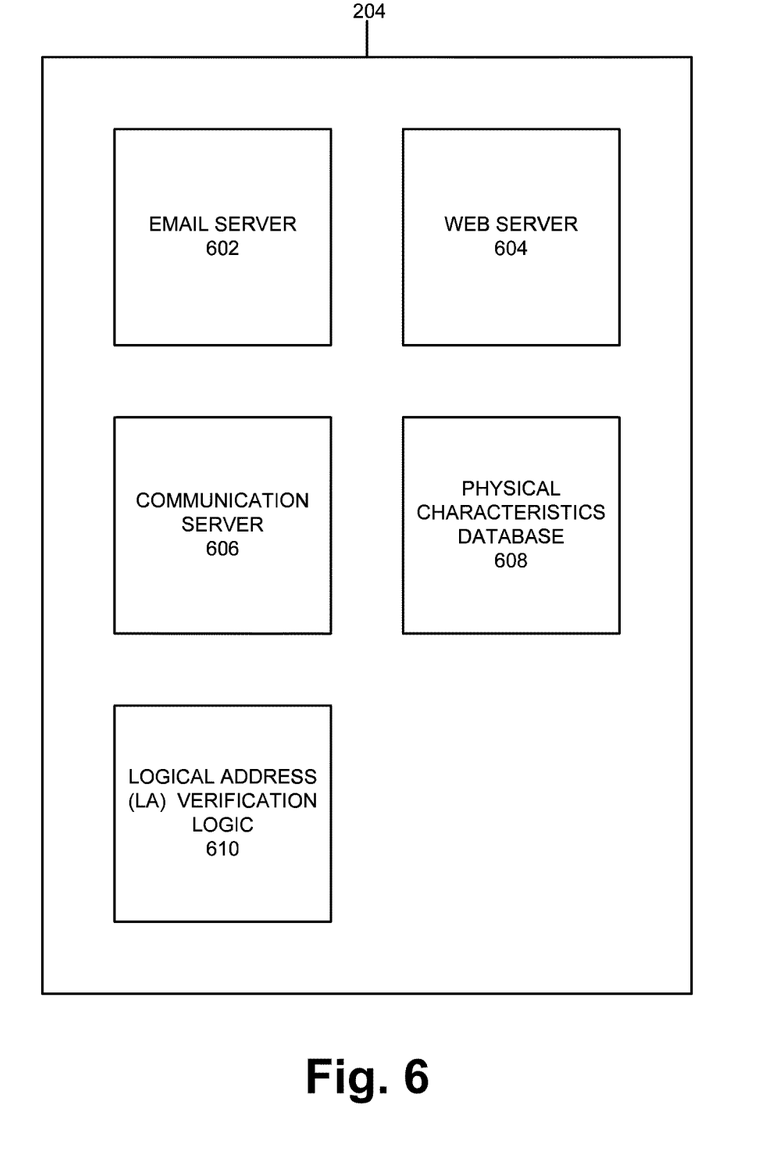
FIG. 6 is a functional block diagram of an exemplary server device of FIG. 2.

FIG. 6 is a functional block diagram of server device 204. As shown server device 204 may include an email server 602, web server 604, communication server 606, physical characteristics database 608, and logical address (LA) verification logic 610. Email server 602 may relay email messages from email clients (e.g., email client 402) to other email clients or other email servers 602. Web server 604 may provide web content/links and/or other types of information to browsers 404 in user devices 202. Communication server 606 may allow user devices 202 and/or server devices to establish communication sessions with one another.

Physical characteristics database 608 may include records of associations between logical addresses and physical characteristics. Examples of logical addresses may include an email address, a Universal Resource Locator (URL), and/or any other types of address that is a logical abstraction of a node in a network. Examples of physical characteristics may include a device characteristic (e.g., a MAC address of a device that is to receive a message), a geographical location associated with the recipient device (e.g., a longitude, latitude, and/or altitude), a time window, and a physical address. In a different implementation, physical characteristics database 608 may include one of more pieces of information to support encryption and/or other security measures (e.g., a public keys in public-key infrastructure (PKI) encryption). Physical characteristics database 608 may support both a forward lookup (e.g., looking up a physical address based on an email address) and a reverse lookup (e.g., looking up an email address based on a physical address).

In some implementations, a service provider (e.g., Internet Service Provider (ISP)) may provide the data stored at physical characteristics database 608. In such cases, the service provider may charge others for using physical characteristics database 608. For example, the service provider may charge a web site (e.g., a site that pops up an icon to indicate that an email address is associated with an actual, physical address) that verifies whether an email address is trustworthy based on the information from physical characteristics database 608. Similarly, the service provider may charge others for performing any lookup in physical characteristics database 608, such as a reverse lookup of an email address based on a physical characteristic (e.g., a physical address).

LA verification logic 610 may verify authenticity of a logical address of a message or request for communication based on physical characteristics. For example, assume that LA verification logic 610 receives a message from physical constraint logic 408. Also, assume that physical constraint logic 408 provides a physical address along with the message. In such a case, when a potential recipient attempts to download the message, LA verification logic 610 may look up, based on the logical address of the message (e.g., the destination email address), a physical address in physical characteristics database 608. If the physical address provided by physical characteristics database 608 matches the physical address that was received along with the message, LA verification logic 610 may allow the recipient to download the message.

In another example, assume that LA verification logic 610 receives a request to verify a geographical location of a call recipient. When a potential recipient attempts to establish a communication session, LA verification logic 610 may request the recipient user device 202 to provide coordinates of its location. When the coordinates from the recipient user device 202 match the coordinates in physical characteristics database 608, LA verification logic 610 may permit the recipient to establish the communication session.

In some implementations, LA verification logic 610 may provide a reverse lookup of a logical address based on physical characteristics. For example, a user may send a physical address to LA verification logic 610 from user device 202. In response, LA verification logic 610 may lookup a logical address (e.g., an email address) using the physical address as a key. Thereafter, LA verification logic 610 may provide the email address to user device 202.

Depending on the implementation, server device 204 may include additional, fewer, or a different arrangement of functional components than those illustrated in FIG. 6. For example, in one implementation, LA verification logic 610 may be integrated into email server 602, web server 604, and/or communication server 606. Alternatively, LA verification logic 610 may be implemented as a stand-alone server application that examines incoming messages from other server devices and/or physical constraint logic 408 in user devices 202. In another example, server device 204 may include components such as an operating system, firewall, etc.

In yet another example, in some implementations, server device 204 may include an IP address-Physical address database with records of associations between IP addresses and physical addresses. In some situations, such a database may be obtained from a service provider. In other situations where the service provider maintains server device 204, the service provider may also maintain the IP address-Physical address database. In these implementations, LA verification logic 610 may query the IP address-Physical address database to verify a physical address based on an IP address, verify the IP address based on the physical address, etc. In other implementations, the IP address-Physical address database and physical characteristics database 608 may be integrated as a single database.

Figure 7:
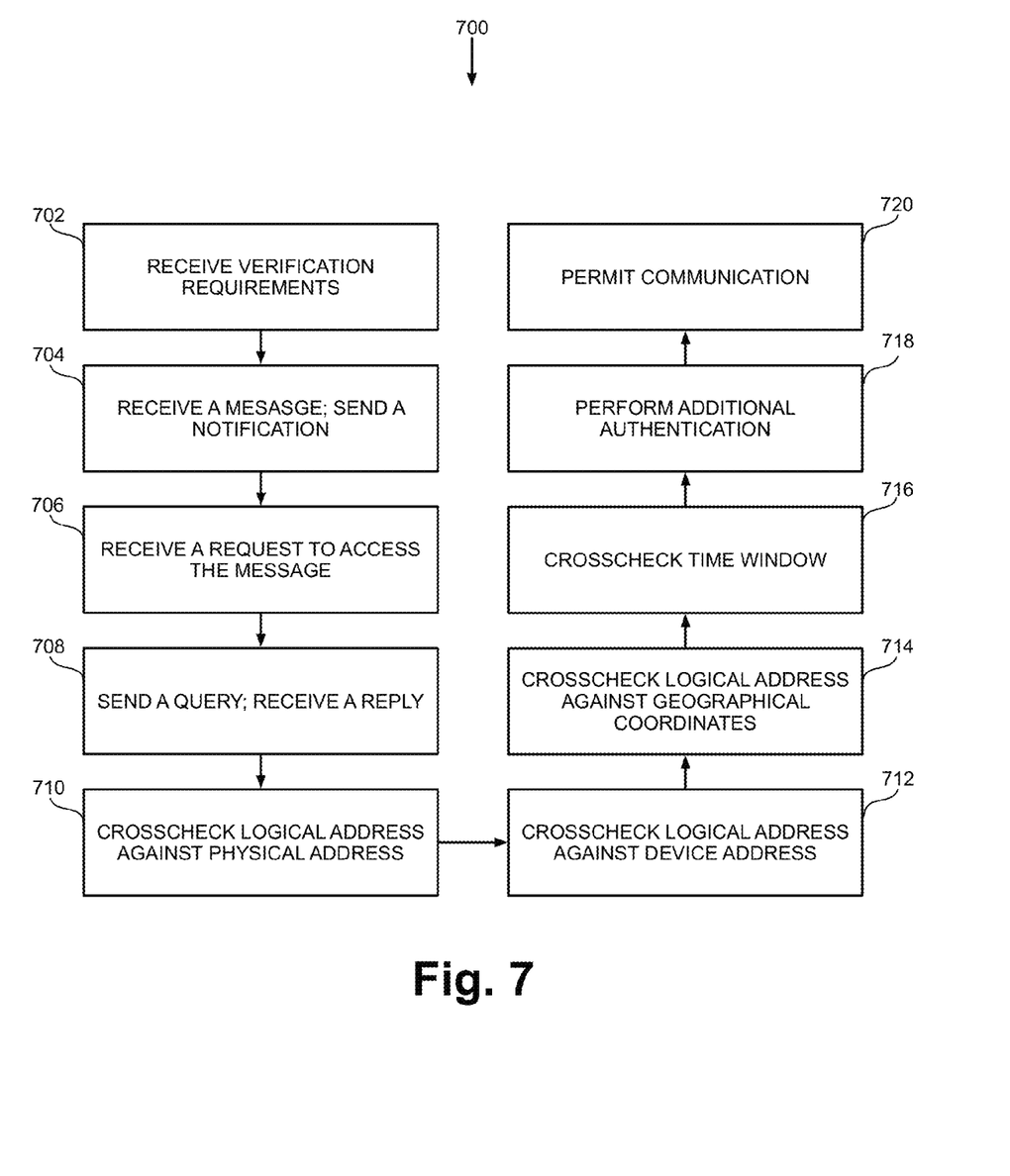
FIG. 7 is a flow diagram of an exemplary process for verifying network delivery of information based on physical characteristics.

FIG. 7 is a flow diagram of an exemplary process for verifying network delivery of information based on physical characteristics. In process 700, actions associated with a corresponding block may be performed by a component in user devices 202 (a sender or a recipient) or server device 204. In the following discussion, however, the process is described in terms of server device 204 performing the actions.

Assume that a user has sent a message. In addition, assume that the user has specified, along with the message, physical characteristics to be used by server device 204 relaying the message to user device 202.

Server device 204 may receive verification requirements (block 702). For example, assume that user device has composed an email message to Benson@wonderland.com (e.g., logical address). In addition, assume that the user has specified verification requirements to include: the physical address of "905 Herndon Parkway, Herndon, Va. 20170"; a request to crosscheck the logical address using the MAC address of the recipient; a request to crosscheck the logical address against geographical coordinates; and a request to crosscheck the time for accessing the message against a specified time window of 2:00 p.m. and 5:00 p.m. Server device 204 may receive the specified verification requirements.

Server device 204 may receive the message along with the verification requirements (block 704). For example, server device 204 may receive a reply from the user in response to a request to provide content (e.g., video clip)) along with the verification requirements.

Server device 204 may forward a notification to the recipient (block 704). Continuing with the previous example, when a recipient user device contacts email server 602 in server device 204 to download email messages, server device 204 may forward a notification to the recipient user device 202, indicating that a message from a sender user device 202 is available.

Server device 204 may receive a request to access the message from the recipient user device 202 (block 706). The recipient user device 202 may send the request to server device 204 in response to the notification from server device 204.

Server device may send a query to the recipient user device 202 (block 708). The query may request information necessary for verifying or crosschecking the logical address. Continuing with the previous example, server device 204 may send a query to the recipient user device 202 requesting a MAC address and geographical coordinates of the recipient user device 202. In some implementations, server device 204 may request additional authentication information (e.g., a shared user id and a password between the recipient and the user).

In response to server device 204, user device 202 may obtain, for example, its geographical coordinates from location component 312 (e.g., a GPS chip) and the MAC address from network interface 310. In some instances and/or implementations, user device 202 may also provide a physical address that is associated with its current location. User device 202 may encapsulate the geographical coordinate information, physical address information, etc., insert the information in a reply, and forward the reply to server device 204.

Server device 204 may receive the reply from the recipient user device 202 (block 708). Continuing with the previous example, server device 204 may receive a reply that includes a MAC address and geographical coordinates (e.g., 38.9617 degrees latitude and −77.398456 degrees longitude) from physical constraint logic 408 in the recipient user device 202. In some implementations, server device 204 may receive the additional authentication information requested at block 706.

Server device 204 may crosscheck the logical address based on a physical address (block 710. The crosscheck may assure the sender user device 202 of validity of the identity or the physical address of the recipient. This may, in some instances, allow the user to satisfy regulatory requirements in sending certain types of emails (e.g., Health Insurance Portability and Accountability Act (HIPAA) emails).

Continuing with a previous example, server device 204 may look up a physical address that is associated with the email address in physical characteristics database 608 and/or the IP address-Physical address database and verify that the physical address provided along with the message is correct. In a different implementation, when the physical address in the databases does not correspond to the address provided in the requirements, server device 204 may query the recipient user device 202 to request a correct physical address and to complete the crosscheck.

Server device 204 may crosscheck the logical address based on a device address (block 712). In some implementations, the recipient user device 202 may have registered a MAC address of network interface 310 or of a router in the recipient user's premise, a permanent IP address, and/or another device address with physical characteristics database 608 or the IP-address-Physical address database in server device 204. In such cases, server device 204 may use the MAC address, the IP address, and/or the other device address to authenticate the recipient user device 202 (e.g., in a case where the recipient user device 202 belongs to an ISP and the ISP has installed the recipient user device 202 with the MAC address at the recipient's premises.

Continuing with the example, server device 204 may match the MAC address received at block 708 against a corresponding device address that is stored in physical characteristics database 608, and successfully perform the crosscheck.

Server device 204 may crosscheck the logical address against geographical coordinates (block 714). Continuing with the previous example, server device 204 may look up a geographical coordinates from physical characteristics database 608 and match the geographical coordinates to those provided by the recipient at block 708.

Server device 204 may crosscheck the time window (block 716). Continuing with the previous example, server device 204 may check the time at which the request to access the message has been received at block 706. Assume that the request from the recipient is received at 2:30 p.m. As noted above for block 702, the specified time window spans 2:00 p.m. to 5:00 p.m. Server device 204 verifies that the time window requirement is met.

Server device 204 may perform additional authentication (block 718). Continuing with the preceding example, server device 204 may perform an authentication based on the reply received at block 708.

Server device 204 may allow the recipient user device 202 to communicate with the sender user device 202 (block 720). Continuing with the example, server device 204 may allow the recipient user device 202 to download the message. In a different example, server device 204 may allow communication application 406 in the recipient user device 202 to establish a communication session between the sender user device 202 and the recipient user device 202.

In process 700, depending on the implementation and desired level of security, user devices 202 and server device 204 may provide for encryption/decryption. For example, at blocks 704-708, server device 204 and/or user devices 202 may encrypt/decrypt the message, the request, and/or the query.

FIGS. 8A through 8D illustrate an example that is associated with verifying network delivery of information based on physical characteristics. More specifically, FIGS. 8A through 8D show messages that are exchanged between user devices 202 in network 200.

Figure 8A:
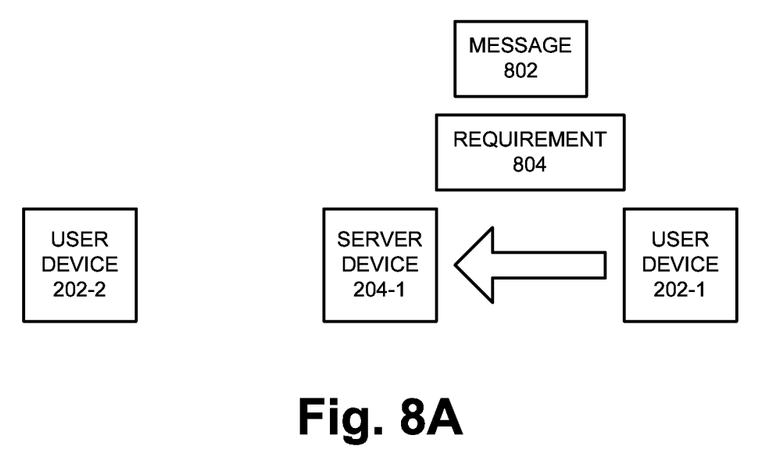
FIG. 8 illustrates an example that is associated with verifying network delivery of information based on physical characteristics.

FIG. 8A illustrates user device 202-1 sending a message 802 and a requirement 804 to a recipient's user device 202-2. Assume that Jerry is at user device 202-1 and Elaine is at user device 202-2. In addition, assume that requirement 804 requires Elaine to access the message between Thursday and Friday, and server device 204-1 to verify a device address of Elaine's user device 202-2 before allowing Elaine's user device 202-2 to download message 802.

Figure 8B:
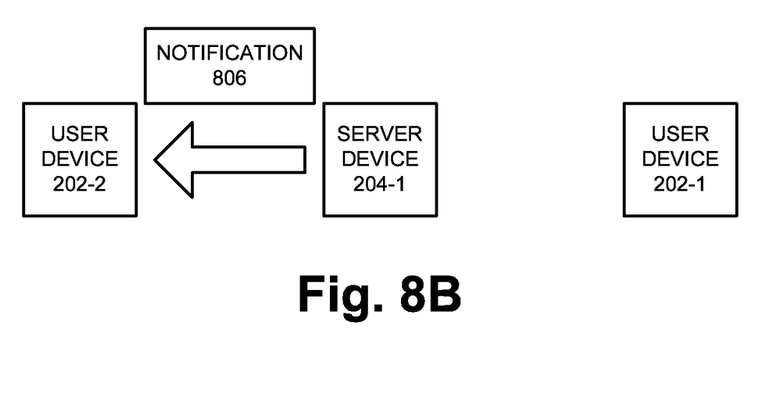
Figure 8C:
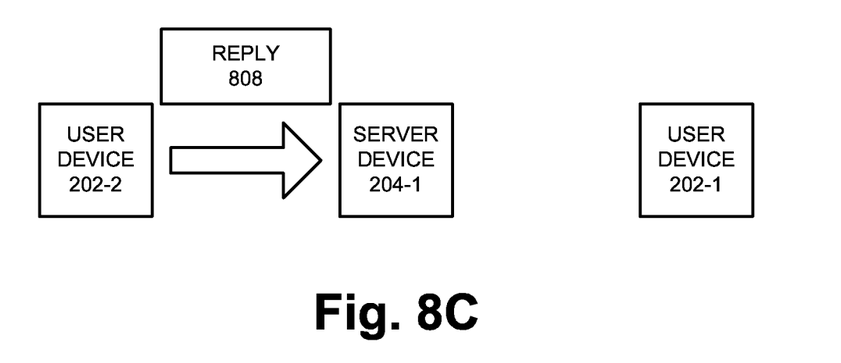

FIG. 8B illustrates server device 204-1 sending a notification 806 to Elaine's user device 202-2. When Elaine logs onto her device 202-2, she notices that her user account at server device 204-1 has received a message from Jerry. Email client 402 indicates to Elaine that upon Elaine's approval, email client 402 will provide verification information (e.g., physical characteristics) to server device 204-1. When Elaine authorizes email client 402 to send a MAC address of a network interface 310 in her user device 202-2, as illustrated in FIG. 8C, user device 202-2 sends reply 808 with the requested information to server device 204-1.

Figure 8D:
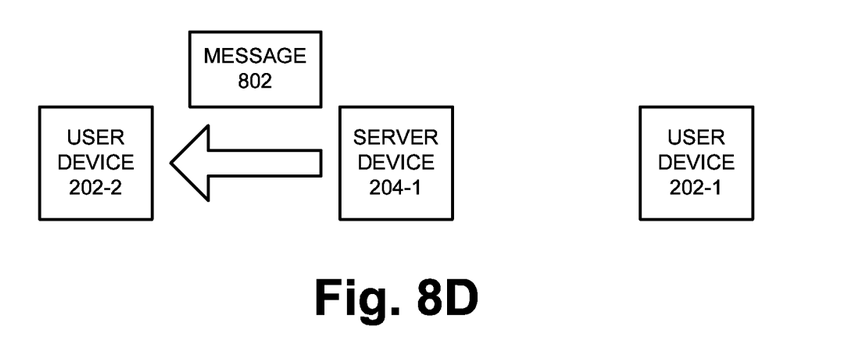

When server device 204-1 receives requested information 808 (i.e., the MAC address), server device 204-1 uses the information to satisfy Jerry's requirement. Assuming that the MAC address indicated in reply 808 matches a MAC address that is stored in physical characteristics database 608 at server device 204-1 and that reply 808 is provided at 3:00 p.m. Thursday, server device 204-1 successfully validates that Elaine's user device 202-2 is the intended recipient of message 802. Thereafter, server device 204-1 allows Elaine's device 202-2 to download message 802.

In the above example, a system may verify network delivery of information device based on physical characteristics, such as a device address, physical address, time of delivery, and/or geographical location. This may provide increased security and flexibility in delivering information.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
   a network interface configured to receive verification requirements and a message addressed to a logical address, from a source device, wherein the verification requirements identify one or more physical characteristics, associated with a destination device, including at least one of:
      a time window for receiving the request to access the message,
      geographical coordinates, including at least one of a latitude, a longitude, or an altitude, of the destination device, or
      a media access control (MAC) address of a component in customer premises equipment associated with the destination device; and
   a processor configured to:
      receive a first request from a destination device to access the message;
      send, to the destination device, a second request for information related to at least one of the identified physical characteristics;
      validate, based on information received in response to the second request, the logical address based on a determination that a physical characteristic associated with the destination device corresponds to the at least one of the identified physical characteristics in the verification requirements; and selectively provide, responsive to the validation, access to the message to the destination device.

2. The device of claim 1, wherein the identified one or more physical characteristics comprise a MAC address that includes:

a MAC address installed by a service provider associated with the destination device.

3. The device of claim 1, wherein the destination device includes one of:

a mobile computer, a smart phone, or a computer.

4. The device of claim 1, further comprising:

a storage to store physical characteristics that are associated with logical addresses, wherein, to validate the logical address, the processor is further configured to:

compare the at least one of the identified physical characteristics to a physical characteristic retrieved from the storage by using the logical address as a key.

5. The device of claim 1, wherein the identified physical characteristics further include a physical address comprising at least one of:

a text message; an email message; a web page; or a file.

6. The device of claim 1, wherein the message includes the verification requirements and the logical address includes one of:

a universal resource locator (URL) or an email address.

7. The device of claim 1, wherein the message includes the verification requirements and:

an encrypted message.

8. A method comprising:

receiving, from a source device, verification requirements, indicative of a physical address of a geographic location and a logical address associated with a destination device;

receiving a request from the destination device to establish a communication session with the source device;

determining, in response to the request, that the received physical address does not correspond to a physical address, identified in the physical characteristics, associated with the logical address;

obtaining, from the destination device and based on the determining, a physical address associated with the logical address;

validating, in response to obtaining the physical address, the logical address based on a correspondence between the obtained physical address and the physical address identified in the verification requirements; and establishing, based on results of the validating, the communication session between the source device and the destination device.

9. The method of claim 8, wherein validating the logical address includes:

obtaining a match between the received logical address and a device address obtained by querying the destination device.

10. The method of claim 8, wherein validating the received logical address includes:

obtaining geographical coordinates, from the destination device, of the destination device, wherein the geographical coordinates include at least one of a latitude, a longitude, or an altitude; and using the geographical coordinates to validate the obtained physical address.

11. The method of claim 10, wherein obtaining the geographical coordinates includes:

obtaining, from the destination device, global positioning system (GPS) information related to a current location of the destination device.

12. The method of claim 8, wherein establishing the communication session includes:

establishing a voice-over-Internet Protocol (VoIP) call between the source device and the destination device.

13. The method of claim 8, wherein establishing the communication session includes:

authenticating the destination device for communicating with the source device.

14. The method of claim 8, wherein validating the logical address includes:

determining whether the destination device is requesting the communication session to be established within a time window prescribed in the verification requirements.

15. The method of claim 8, further comprising:

notifying the destination device via the logical address when the verification requirements are received.

16. Non-transitory computer-readable memory media, comprising:

one or more instructions that, when executed by at least one processor, cause the at least processor one to:

receive, from a source device, verification requirements, indicative of a physical address of a geographic location and a logical address associated with a destination device, receive a request from the destination device to establish a communication session with the source device, determine, in response to the request, that the received physical address does not correspond to a physical address, identified in the physical characteristics, associated with the logical address, obtain, from the destination device and based on a determination, a physical address associated with the logical address, validate, in response to obtaining the physical address, the logical address based on a correspondence between the obtained physical address and the physical address identified in the verification requirements, and establish, based on results of a validation, the communication session between the source device and the destination device.

17. The non-transitory computer-readable memory media of claim 16, wherein to validate the logical address, the one or more instructions cause the at least processor one to:

obtain a match between the received logical address and a device address obtained by querying the destination device.

18. The non-transitory computer-readable memory media of claim 16, wherein to validate the received logical address, the one or more instructions cause the at least processor one to:

obtain geographical coordinates, from the destination device, of the destination device, wherein the geographical coordinates include at least one of a latitude, a longitude, or an altitude; and use the geographical coordinates to validate the obtained physical address.

19. The non-transitory computer-readable memory media of claim 18, wherein to obtain the geographical coordinates, the one or more instructions cause the at least processor one to:

obtain global positioning system (GPS) information related to a current location of the destination device.

20. The non-transitory computer-readable memory media of claim 16, wherein to validate the logical address, the one or more instructions cause the at least processor one to:
   determine whether the destination device is requesting the communication session to be established within a time window prescribed in the verification requirements.

* * * * *